(12) United States Patent
Kim (10) Patent No.: US 8,440,334 B2
(45) Date of Patent: May 14, 2013

(54) RECHARGEABLE BATTERY

(75) Inventor: Yong-Sam Kim, Suwon-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 509 days.

(21) Appl. No.: 12/659,475

(22) Filed: Mar. 10, 2010

(65) Prior Publication Data

US 2010/0247989 A1 Sep. 30, 2010

(30) Foreign Application Priority Data

Mar. 30, 2009 (KR) ........................ 10-2009-0027120

(51) Int. Cl.
*H01M 2/26* (2006.01)
*H01M 4/64* (2006.01)
*H01M 4/66* (2006.01)
*H01M 4/70* (2006.01)

(52) U.S. Cl.
USPC ............... 429/7; 429/161; 429/211; 429/517; 429/519; 429/522

(58) Field of Classification Search .................. 429/161, 429/163–165, 175, 176, 178, 179, 209, 211, 429/7, 514, 517, 519, 522
See application file for complete search history.

(56) References Cited

U.S. PATENT DOCUMENTS

| | | | |
|---|---|---|---|
| 7,867,644 B2* | 1/2011 | Aota et al. | 429/94 |
| 8,227,107 B2* | 7/2012 | Akou et al. | 429/161 |
| 2002/0004162 A1* | 1/2002 | Satoh et al. | 429/94 |
| 2004/0247998 A1* | 12/2004 | Nakanishi et al. | 429/161 |
| 2005/0287429 A1* | 12/2005 | Cho et al. | 429/161 |
| 2006/0024578 A1* | 2/2006 | Lee | 429/208 |
| 2006/0068276 A1* | 3/2006 | Yoo et al. | 429/161 |
| 2006/0204841 A1* | 9/2006 | Satoh et al. | 429/161 |
| 2008/0070111 A1 | 3/2008 | Abe et al. | |

FOREIGN PATENT DOCUMENTS

| | | |
|---|---|---|
| JP | 2001-325938 A | 11/2001 |
| JP | 2005-142026 A | 6/2005 |
| JP | 2006-228591 A | 8/2006 |
| JP | 2008-034356 A | 2/2008 |

OTHER PUBLICATIONS

Korean Office Action in KR 10-2009-0027120, dated Jan. 21, 2011 (Kim).

* cited by examiner

*Primary Examiner* — Joseph Drodge
(74) *Attorney, Agent, or Firm* — Lee & Morse, P.C.

(57) ABSTRACT

A rechargeable battery including a case containing an electrode assembly, the electrode assembly having a coated region and an uncoated region, a lead member inside the case, the lead member surrounding at least a part of the uncoated region of the electrode assembly and having a first thickness, an electrode terminal connected to the lead member, and a current collecting plate having a second thickness that is thinner than the first thickness and coupled to the lead member and to the uncoated region.

19 Claims, 12 Drawing Sheets

RECHARGEABLE BATTERY

BACKGROUND

1. Field

Embodiments relate to a rechargeable battery.

2. Description of the Related Art

A rechargeable battery may include a case housing an electrode assembly.

The electrode assembly may include a pair of electrode plates with a separate therebetween. The electrode assembly may be formed in a jelly-roll shape by spirally winding positive and negative electrodes at both sides of the separator. A cap plate may close and seal the case. An electrode terminal may be electrically connected to the electrode assembly and protrude outside the case through a terminal hole in the cap plate. A current collecting plate may connect the electrode assembly to the electrode terminal.

The current collecting plate may be welded to the electrode assembly by, e.g., laser welding. Because of this connection method, the current collecting plate should be thin. The small thickness may increase electrical resistance along a length direction of the current collecting plate. In addition, the electrode assembly may undesirably move inside the case as a result of vibration or impact. Further, since the thin current collecting plate may be welded to the electrode assembly, the bonding strength of a welding point between the current collecting plate and the electrode assembly may be low; and the welding point may separate, interrupting the functioning of the battery.

The above information disclosed in this Background section is only for enhancement of understanding of the background and therefore does not necessarily constitute prior art or subject matter known in this country to a person of ordinary skill in the art.

SUMMARY

Embodiments are directed to a rechargeable battery, which substantially overcomes one or more of the drawbacks, limitations and/or disadvantages of the related art.

It is a feature of an embodiment to provide a rechargeable battery having a current collecting plate capable of being strongly welded to the electrode assembly.

It is another feature of an embodiment to provide a rechargeable battery that suppresses electrical resistance between a current collecting plate and an electrode assembly.

At least one of the above and other features and advantages may be realized by providing a rechargeable battery including a case containing an electrode assembly, the electrode assembly having a coated region and an uncoated region, a lead member inside the case, the lead member surrounding at least a part of the uncoated region of the electrode assembly and having a first thickness, an electrode terminal connected to the lead member, and a current collecting plate having a second thickness that is thinner than the first thickness and coupled to the lead member and to the uncoated region.

The current collecting plate may be welded to the uncoated region, and at least a portion of the uncoated region may be deformed when welded to the current collecting plate.

The lead member may have a penetration hole disposed therein, and the current collecting plate may be welded to the uncoated region through the penetration hole.

The lead member may include a first corresponding portion facing an end of the uncoated region and having a penetration hole disposed therein, a second corresponding portion bent relative to the first corresponding portion and disposed on sides of the uncoated region, and the current collecting plate may include a first connection portion welded to the first corresponding portion adjacent to the penetration hole, and a second connection portion bent relative to the first connection portion, protruding from the first connection portion toward the uncoated region and welded to the uncoated region.

The second connection portion may be configured to apply pressure to the uncoated region.

The current collecting plate may further include an indentation portion bent relative to the second connection portion and protrude toward the uncoated portion from an internal surface of the second connection portion to indent the uncoated region.

The indentation portion may extend along a first direction across a center of the penetration hole and toward the uncoated region in a second direction that crosses the first direction.

The uncoated region may include a plurality of spiral-wound layers and the indentation portion may be indented in a direction that crosses the plurality of spiral-wound layers of the uncoated region.

The indentation portion may include a plurality of indentation portions arranged along a first direction of the penetration hole and respectively extend in a second direction that crosses the first direction.

The indentation portion may have a polygonal shape having an open end facing away from the electrode assembly.

The polygonal shape having an open end may include at least one of a quadrangle, a triangle and a trapezoid.

The indentation portion may have a semicircular shape having an open end facing away from the electrode assembly.

The uncoated region may include a plurality of spiral-wound layers and the indentation portion may extend in a direction substantially parallel to the plurality of spiral-wound layers.

The penetration hole may extend in a first direction and the indentation portion may extend in a direction parallel with the first direction of the penetration hole.

The indentation portion may include a plurality of indentation portions disposed along a second direction that crosses the first direction of the penetration hole.

The first corresponding portion may further include a gas outlet.

The penetration hole may extend in a first direction and have two sides in the first direction and the first connection portion may be connected to both of the two sides of first direction of the penetration hole.

The penetration hole may extend in a first direction and in a second direction that crosses the first direction, the penetration hole having a pair of sides in the second direction, and the first connection portion may be connected to both of the pair of sides in the second direction of the penetration hole.

The rechargeable battery may further include a cap plate having a terminal hole, the cap plate sealing an opening of the case; the electrode terminal protruding through the terminal hole of the cap plate, and the electrode assembly may include a positive electrode and a negative electrode wound with a separator therebetween.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0027120, filed on Mar. 30, 2009, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
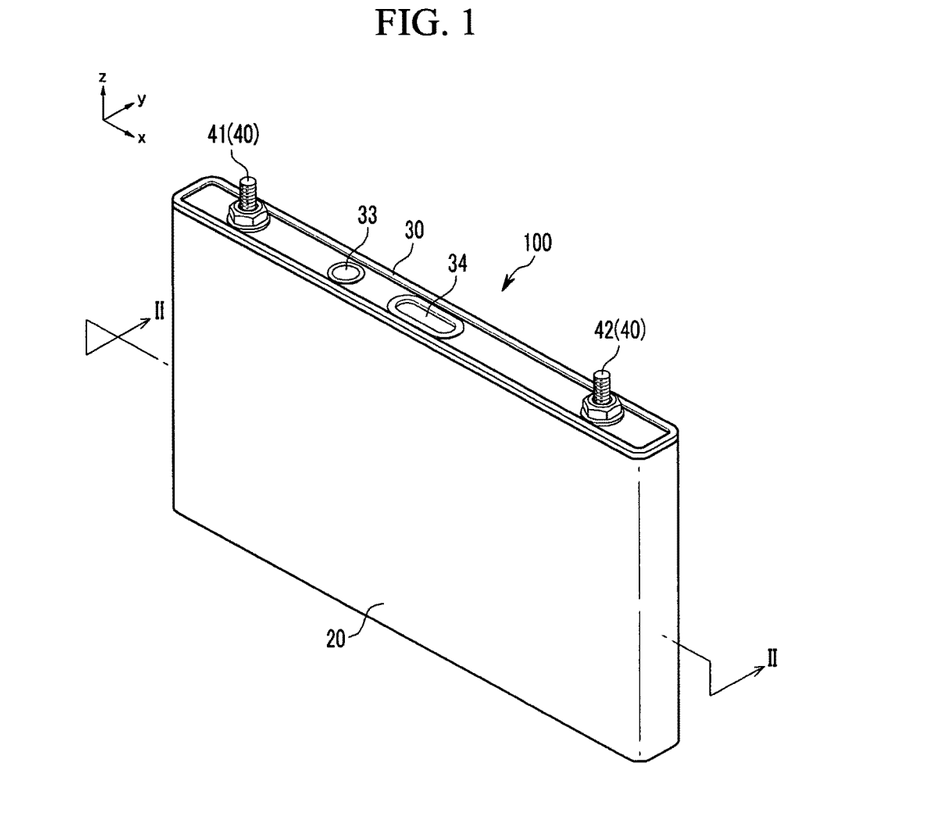
FIG. 1 illustrates a perspective view of a rechargeable battery according to a first embodiment.
Figure 2:
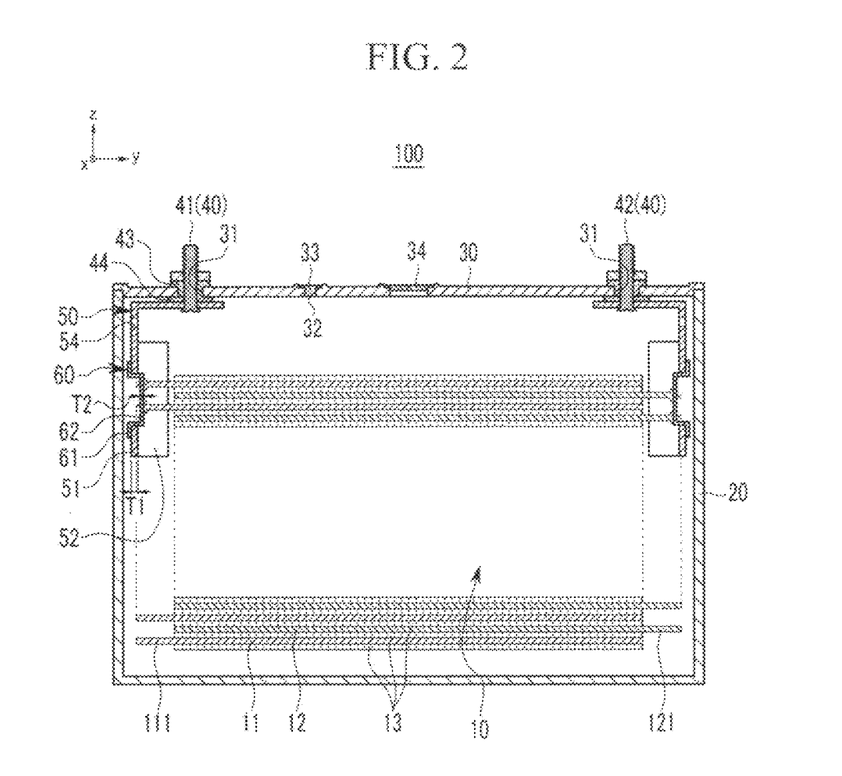
FIG. 2 illustrates a cross-sectional view of FIG. 1, taken along the line II-II thereof.

FIG. 1 illustrates a perspective view of a rechargeable battery according to a first embodiment. FIG. 2 illustrates a cross-sectional view of FIG. 1, taken along the line II-II thereof. Referring to FIG. 1 and FIG. 2, a rechargeable battery 100 may include a case 20 including an electrode assembly 10, a cap plate 30 that closes and seals an opening in a side of the case 20, an electrode terminal 40 in a terminal hole 31 of the cap plate 30 and a lead member 50 and a current collecting plate 60 connecting the electrode terminal 40 to the electrode assembly 10.

The electrode assembly 10 may be formed in a jelly-roll shape by disposing a positive electrode 11 and a negative electrode 12 on respective sides of an insulating separator 13, and spirally winding the positive electrode 11, the negative electrode 12 and the separator 13 together. The positive electrode 11 and the negative electrode 12 may respectively include a coated region and an uncoated region. The coated region may include a current collector formed of, e.g., a thin metal foil, coated with an active material. Uncoated regions 111 and 121 may include portions of the current collector not coated with the active material. The uncoated regions 111 and 121 may be respectively disposed at opposite ends of the positive electrode 11 and the negative electrode 12 in length directions thereof. The uncoated regions 111 and 121 may be respectively connected to an electrode terminal 40, e.g., a positive electrode terminal 41 or a negative electrode terminal 42, through the lead member 50.

The case 20 may form the entire exterior of the rechargeable battery 100. The case 20 may be made of a conductive metal, e.g., aluminum, an aluminum alloy or nickel-plated steel. The case 20 may include a space that houses the electrode assembly 10 and may have a, e.g., prismatic hexahedron shape.

Figure 3:
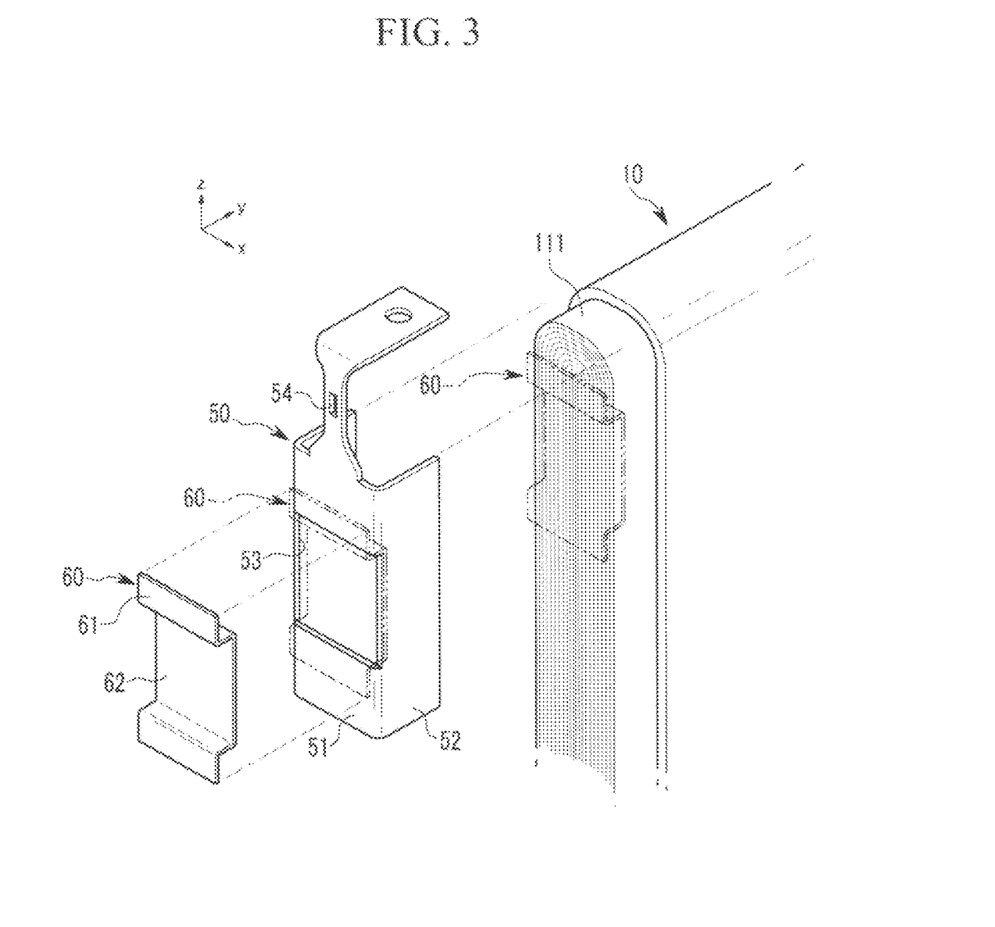
FIG. 3 illustrates an exploded perspective view of a lead member, a current collecting plate and an electrode assembly.

FIG. 3 illustrates an exploded perspective view of a lead member, a current collecting plate and an electrode assembly. Referring to FIGS. 1 to 3, the uncoated regions 111 and 121 of the electrode assembly 10 in the case 20 may have directivity. The uncoated region 111 of the positive electrode 11 may have the same structure as the uncoated region 121 of the negative electrode 12, and therefore only the uncoated region 111 of the positive electrode 11 will be exemplarily described.

Since the positive electrode 11 may be continuously wound, an end of the uncoated region 111 may form spiral lines that expand outward around the center of the electrode assembly 10. That is, ends of the uncoated region 111 may include a straight line portion extending in a first, e.g., vertical, direction (hereinafter, z-axis direction) and arranged along a second, e.g., horizontal, direction (hereinafter, x-axis direction) substantially perpendicular to the z-axis direction. An arc portion may be connected in a half circle or a half-oval shape to ends of the straight portion in the z-axis direction and arranged along the z-axis direction.

The cap plate 30 may include a thin plate and may be disposed in an opening at an end of the case 20 to close and seal the opening. The cap plate 30 may include an electrolyte injection opening 32 for injecting an electrolyte into the sealed case 20. The electrolyte injection opening 32 may be sealed with a sealing cap 33 after injection of the electrolyte. The cap plate 30 may have a vent portion 34 that may be broken when internal pressure of the rechargeable battery 100 reaches a predetermined level, in order to prevent, e.g., explosion of the rechargeable battery 100.

The electrode terminal 40 may be disposed in a terminal hole 31 of the cap plate 30. An outer insulator 43 and an inner insulator 44 may be disposed on the terminal hole 31. The electrode terminal 40 may protrude outward and inward from the cap plate 30 through the terminal hole 31. The terminal hole 31, the inner insulator 44 and the outer insulator 43 may have the same structure in the positive electrode terminal 41 and the negative electrode terminal 42, and therefore only the terminal hole 31, the inner insulator 44 and the outer insulator 43 of the positive electrode terminal 41 will now be exemplarily described.

The outer insulator 43 may be partially inserted into the terminal hole 31 from outside of the cap plate 30 and may electrically insulate the positive electrode terminal 41 from the cap plate 30. Thus, the outer insulator 43 may insulate the positive electrode terminal 41 from an external surface of the cap plate 30, while simultaneously insulating the positive electrode terminal 41 from an internal surface of the terminal hole 31. In the present embodiment, the external insulator 43 may include a portion corresponding to an external surface of the cap plate 30 integral with a portion corresponding to an internal surface of the terminal hole 31. Alternatively, the portions of the external insulator 43 may be separately formed (not shown). The inner insulator 44 may electrically insulate an inside of the cap plate 30 from the corresponding lead member 50.

The lead member 50 may be electrically connected to the electrode terminal 40 inside of the case 20. The lead member 50 may surround the corresponding parts of the uncoated region 111 adjacent thereto. The lead member 50 may have a first thickness T1. The current collecting plate 60 may electrically connect the lead member 50 and the uncoated region 111. The current collecting plate 60 may have a second thickness T2 that is thinner than the first thickness T1. Therefore, the current collecting plate 60 having the second thickness T2 may be, e.g., laser welded and/or resistance welded, to the uncoated region 111, while the lead member 50 having the first thickness T1 may surround at least parts of the uncoated region 111 with strong rigidity. That is, the lead member 50 may reinforce a welding point between the current collecting plate 60 and the uncoated region 111. The lead member 50 and the current collecting plate 60 may have the same respective structures corresponding to the positive and negative electrodes 11 and 12, and therefore only the uncoated region 111 of the positive electrode 11 will be described hereinafter.

Referring back to FIG. 2 and FIG. 3, the portion of the uncoated region 111 of the positive electrode 11 welded to the current collecting plate 60 may be maintained in an at least partially deformed state. That is, the current collecting plate 60 may be welded to the uncoated region 111 while deforming the uncoated region 111 at an end thereof.

For example, the lead member 50 may have a penetration hole 53 penetrating therethrough. The current collecting plate 60 may be disposed in the penetration hole 53 and welded to the uncoated region 111. In further detail, the lead member 50 may include a first corresponding portion 51 facing an end of the uncoated region 111 and a second corresponding portion 52 corresponding to sides of the uncoated region 111. The penetration hole 53 may be formed in the first corresponding portion 51. The first corresponding portion 51 may be substantially parallel to an xz plane, and the second corresponding portion 52 may be substantially parallel to a yz plane, as illustrated in FIG. 3. The second corresponding portion 52 may include a pair of second corresponding portions 52 disposed on opposite sides of the uncoated region 111. The second corresponding portions 52 may be welded to the opposite sides of the uncoated region 111. The connection between the second corresponding portion 52 and the uncoated region 111 may be a mechanical connection and/or an electrical connection. The first corresponding portion 51 of the lead member 50 may include a gas outlet 54 to emit gas generated from the uncoated region 111 of the electrode assembly 10 to the outside.

The current collecting plate 60 may include a first connection portion 61 coupled to the lead member 50 and a second connection portion 62 coupled to the uncoated region 111. The first connection portion 61 may be welded to the first corresponding portion 51 around the penetration hole 53. The first connection portion 61 may be welded to an internal surface or an external surface of the first corresponding portion 51. The second connection portion 62 may be bent relative to the first connection portion 61 and may protrude closer to the uncoated region 111 than an internal surface of the first corresponding portion 51, so as to be welded to the end of the uncoated region 111. In this case, the uncoated region 111 may be welded while being deformed by the second connection portion 62. In FIG. 3, the dotted line represents the deformation of the uncoated region 111 by the current collecting plate 60 when the rechargeable battery of the present embodiment is assembled.

Since the current collecting plate 60 may have the second thickness T2 thinner than the first thickness T1 of the lead member 50, the current collecting plate 60 may be easily, e.g., laser-welded and/or resistance-welded, to the lead member 50. The deformation of the uncoated region 111 may, allow the current collecting plate 60 to be welded using the entire area of the second connection portion 62, thereby increasing the size and thickness of the welding point between the second connection portion 62 and the uncoated region 111. Thus, electrical resistance may be reduced and bonding strength of the welding point may be improved.

When connecting the positive electrode terminal 41 and the uncoated region 111 of the electrode assembly 10, the lead member 50 having the first thickness T1, which may be relatively thick, may be mechanically connected to the uncoated region 111. Thus, the bonding strength between the current collecting plate 60 and the uncoated region 111 may be increased, advantageously maintaining a connection in the event that the electrode assembly 10 moves in the case 20 due to, e.g., vibration or impact. That is, e.g., external vibration or impact, may not be easily transmitted to the welding point between the current collecting plate 60 and the uncoated region 111. In addition, the current collecting plate 60 having the second thickness T2, which may be relatively thin, may be electrically connected to the uncoated region 111.

TABLE 1

| | Comparative Example 1 | Comparative Example 2 | First Exemplary Embodiment |
|---|---|---|---|
| Length (z-axis direction) (mm) | 20 | 20 | |
| Width (x-axis direction) (mm) | 8 | 8 | |
| Thickness (y-axis direction) (mm) | 0.5 | 1.5 | |
| Positive electrode resistance (mΩ) | 1.405 | 0.468 | 0.703 |
| Negative electrode resistance (mΩ) | 0.880 | 0.293 | 0.440 |
| Total electrode resistance (mΩ) | 2.285 | 0.762 | 1.143 |

As shown in Table 1, due to its thickness, the electrical resistance of a current collecting plate 60 according to the first embodiment may be greater than that of the current collecting plate according to Comparative Example 2, thereby easing laser welding. Again due to its thickness, the electrical resistance of the current collecting plate 60 according to the first embodiment, may be about 50% lower than that of the Comparative Example 1, which may be better for laser welding. However, the decreased thickness of Comparative Example 1 may make the current collecting plate more susceptible to shock and vibration.

Hereinafter, other embodiments and variations will be described. Repeated description of parts that are similar to or the same as those of the first embodiment will be omitted.

Figure 4:
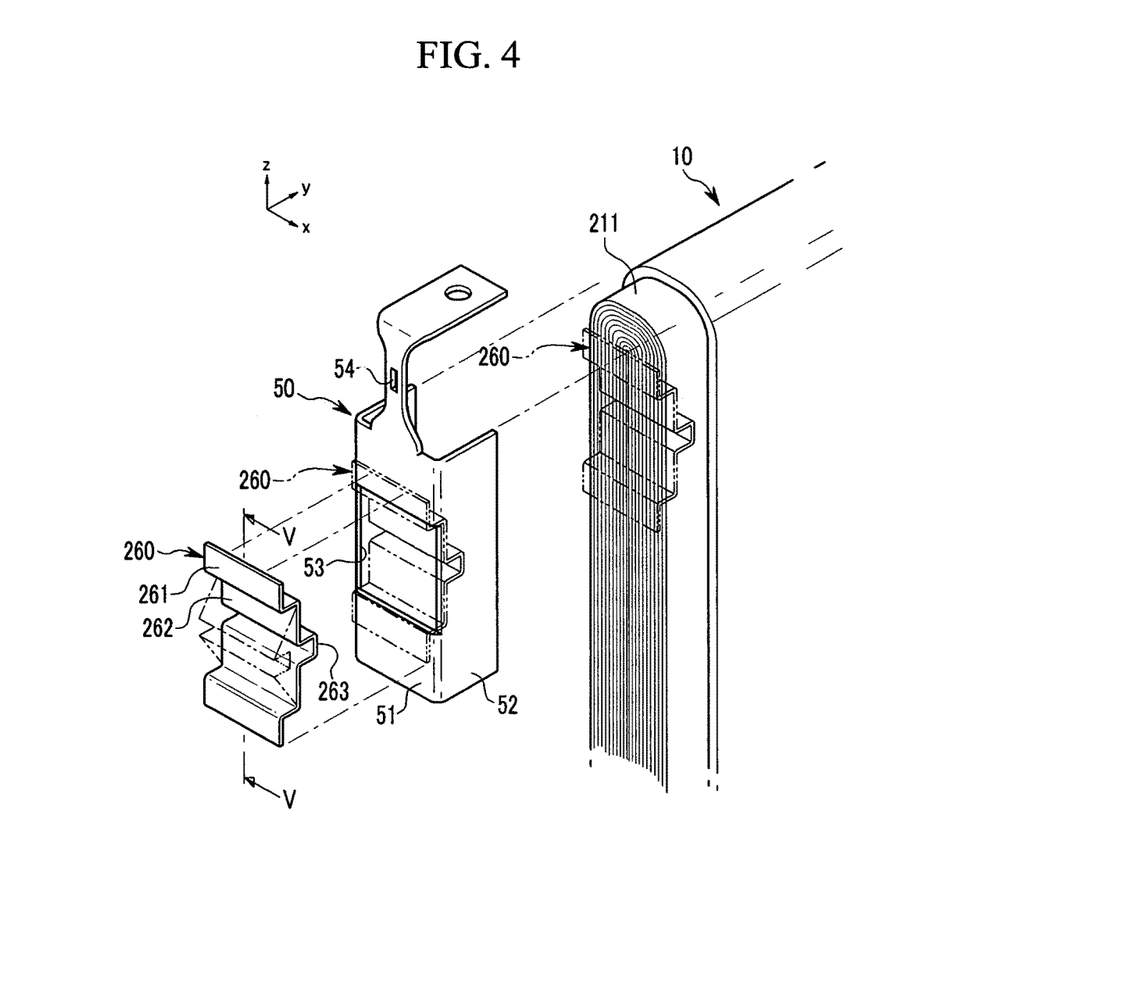
FIG. 4 illustrates an exploded perspective view of a lead member, a current collecting plate and an electrode assembly in a rechargeable battery according to a second embodiment.
Figure 5:
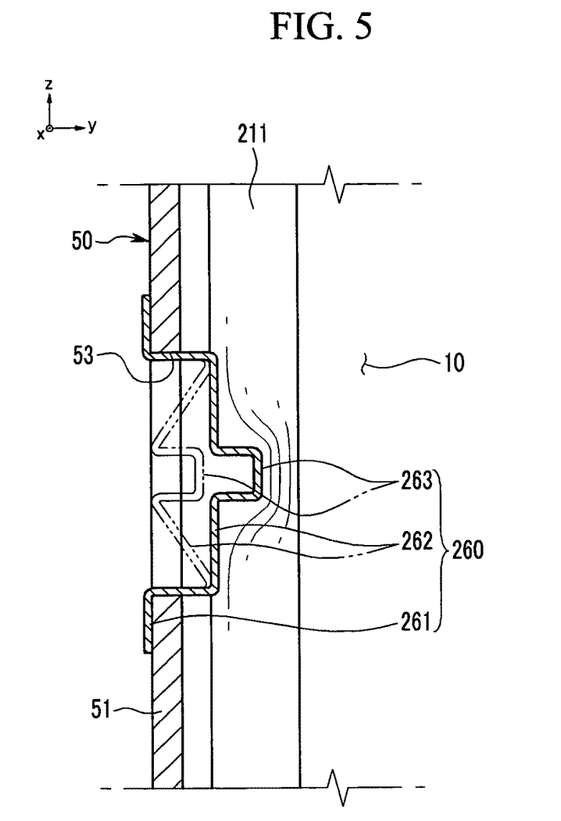
FIG. 5 illustrates a cross-sectional view of FIG. 4, taken along the line V-V thereof.

FIG. 4 illustrates an exploded perspective view of a lead member 50, a current collecting plate 260 and an electrode assembly 10 of a rechargeable battery according to a second embodiment. FIG. 5 illustrates a cross-sectional view of FIG. 4, taken along the line V-V thereof. Referring to FIG. 4 and FIG. 5, the current collecting plate 260 may be disposed on an uncoated region 211 with increased pressure, compared to that of the current collecting plate 60 of the first embodiment disposed in the uncoated region 111 in a static condition. That is, a second connection portion 262 of the current collecting plate 260 may have an elastic force that presses the current collecting plate 260 toward an end of the uncoated region 211.

As shown in FIG. 4, prior to assembly, the current collecting plate 260 of the second embodiment may maintain a separated state (dotted line) from the uncoated region 211 along the y-axis in a lead member 50. As shown in FIG. 4, when the lead member 50 is coupled to the uncoated region 211, the lead member 50 may surround part of the uncoated region 211. The current collecting plate 260 may contact the uncoated region 211. In this case, the second connection portion 262 of the current collecting plate 260 may be electrically connected to the uncoated region 211, while deforming and pressing the uncoated region 211. Elastic force exerted by the current collecting plate 260 may increase bonding strength of a welding point between the current collecting plate 260 and the uncoated region 211, and may suppress an increase of electrical resistance at the welding point.

The current collecting plate 260 may further include an indentation portion 263 in the second connection portion 262. The indentation portion 263 may be bent relative the second connection portion 262 and protrude into an end of the uncoated region 211 to thereby indent the uncoated region 211 and be welded thereto. Therefore, the indentation portion 263 may indent the uncoated region 211 in the y-axis direction further than the indentation of the uncoated region 211 by the second connection portion 262. In this case, the uncoated region 211 may be welded in the state of further deformation by the indentation portion 263. FIG. 5 illustrates the uncoated region 211 in the welding state after being compress-deformed. An indentation welding structure of the indentation portion 263 and the uncoated region 211 may increase bonding strength of the welding point and may suppress an increase in electrical resistance in the welding point.

The indentation portion 263 may extend in the x-axis direction across a center of the penetration hole 53. Therefore, the indentation portion 263 may protrude in a direction that crosses spiral-wound layers of the uncoated region 211. In other words, the layers of the uncoated region 211 may be in a straight line along the z-axis direction, and the indentation portion 263 may be disposed along the x-axis direction.

In addition, the indentation portion 263 may have a quadrangular structure, wherein a side opposite to the uncoated region 211 may be opened at a cross-section of the yz plane in the penetration hole 53 of the lead member 50. The indentation portion 263 may more easily indent the uncoated region 211 when a length of the indentation portion 263 in the z-direction is small. However, the indentation portion 263, while indenting the uncoated region 211, may be more easily welded to the uncoated region 211 when the length of the indentation portion 263 in the z-direction is large. That is, a balance is maintained between ease of indentation and ease of welding.

FIG. 6 to FIG. 9 illustrate cross-sectional views of third to sixth embodiments. Referring to FIG. 6 to FIG. 9, more embodiments will be described.

Figure 6:
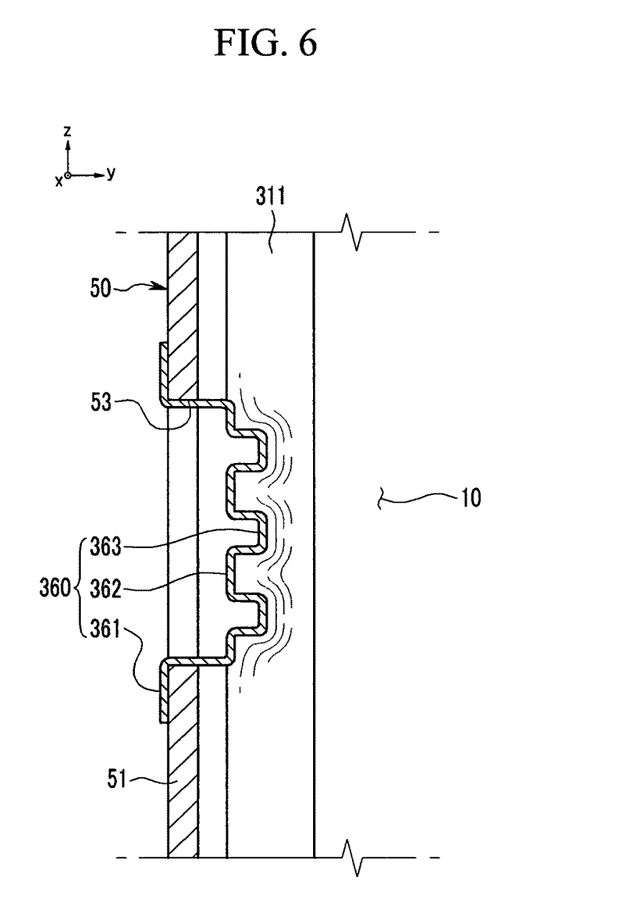
FIG. 6 to FIG. 9 illustrate cross-sectional views of rechargeable batteries according to third to sixth embodiments.

Referring to FIG. 6, a current collecting plate 360 of a third embodiment may include a first connection portion 361, a second connection portion 362 and a plurality of indentation portions 363. The first and second connection portions 361 and 362 may be substantially parallel to each other. The indentation portions 363 may be bent relative to the second connection portion 362. The indentation portions 363 of the third embodiment may be arranged along the z-axis direction. The plurality of indentation portions 363 may indent the uncoated region 311 further in the y-axis direction than the second connection portion 362. An indentation welding structure of the plurality of indentation portions 363 may further increase bonding strength of the welding point and further suppresses an increase in electrical resistance in the welding point.

Figure 7:
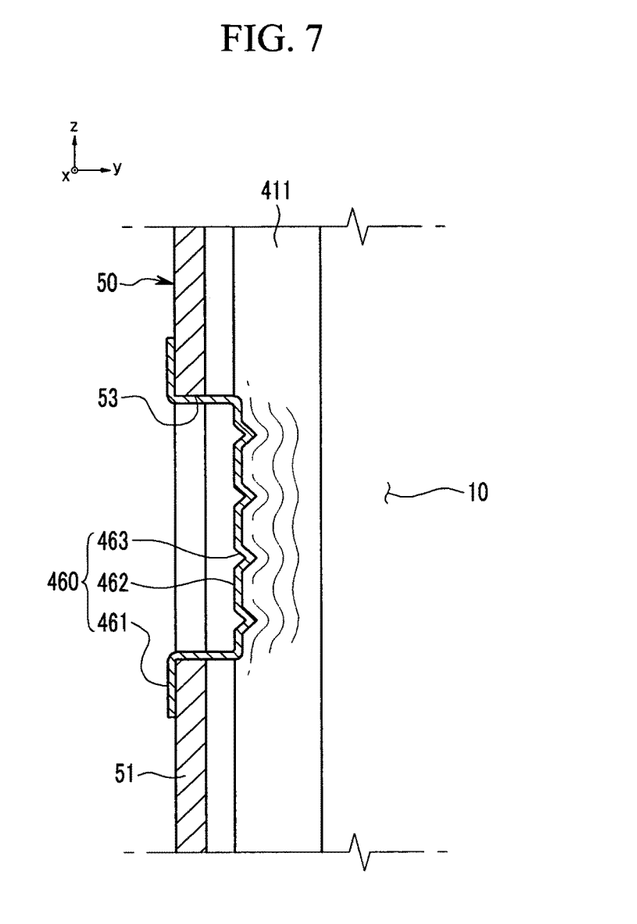

Referring to FIG. 7, a current collecting plate 460 of the fourth embodiment may include a first connection portion 461, a second connection portion 462 and a plurality of indentation portions 463. The first and second connection portions 461 and 462 may be substantially parallel to each other. The indentation portions 463 may be bent relative to the second connection portion 462. Each indentation portion 463 may be formed as a triangular structure of which a side opposite to an uncoated region 411 may be opened at a cross-section of the yz plane in the penetration hole 53 of the lead member 50. Each indentation portion 463 may have a pointed end pointing in the y-axis direction so that a welding area with the uncoated region 411 may be small compared to the third exemplary embodiment, but may easily indent the uncoated region 411.

Figure 8:
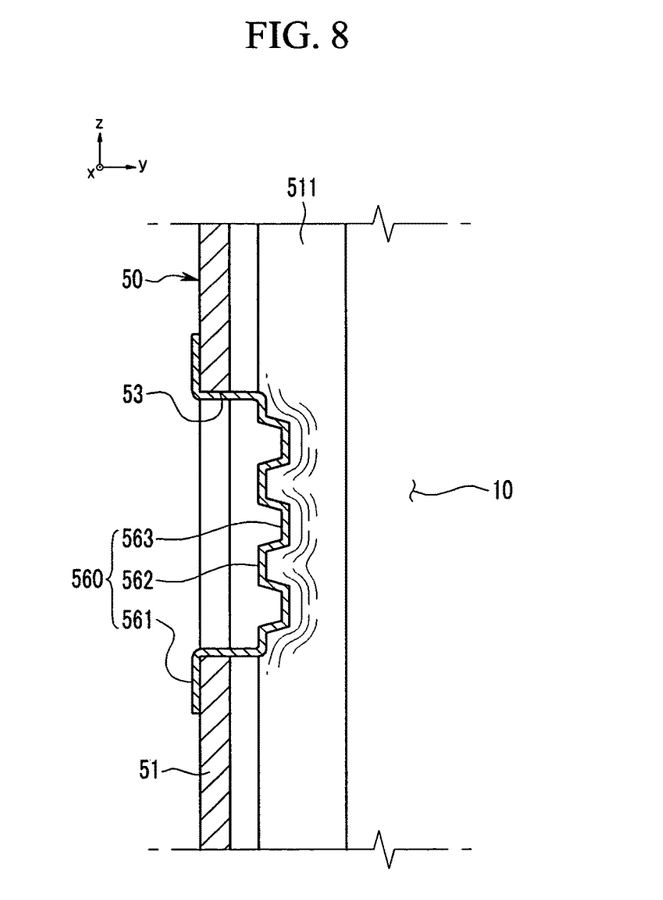

Referring to FIG. 8, a current collecting plate 560 according to a fifth embodiment may include a first connection portion 561, a second connection portion 562 and an indentation portion 563 bent relative the second connection portion 562. The first and second connection portions 561 and 562 may be substantially parallel to each other. Each indentation portion 563 may have a trapezoidal shape of which a side opposite to an uncoated region 511 may be opened at a cross-section of the yz plane in the penetration hole 53 of the lead member 50. Since the indentation portion 563 may have an inclined side, it may easily indent the uncoated region 511 while still forming a large welding area with the uncoated region 511.

Figure 9:
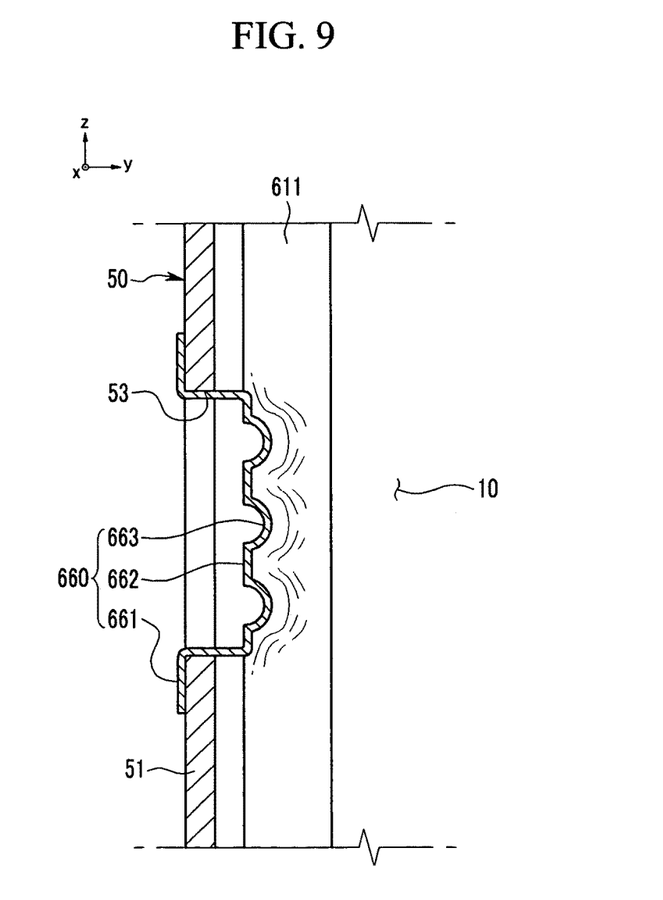

Referring to FIG. 9, a current collecting plate 660 according to a sixth exemplary embodiment may include a first connection portion 661, a second connection portion 662 and an indentation portion 663 bent relative to the second connection portion 662. The first and second connection portions 661 and 662 may be substantially parallel to each other. The indentation portion 663 may have a semicircle shape in which a side opposite to an uncoated region 611 may be opened at a cross-section of the yz plane in the penetration hole 53 of the lead member 50. The indentation portion 663 may have an arced surface so that it may easily indent the uncoated region 661 while still forming a large welding area with the uncoated region 611.

Figure 10:
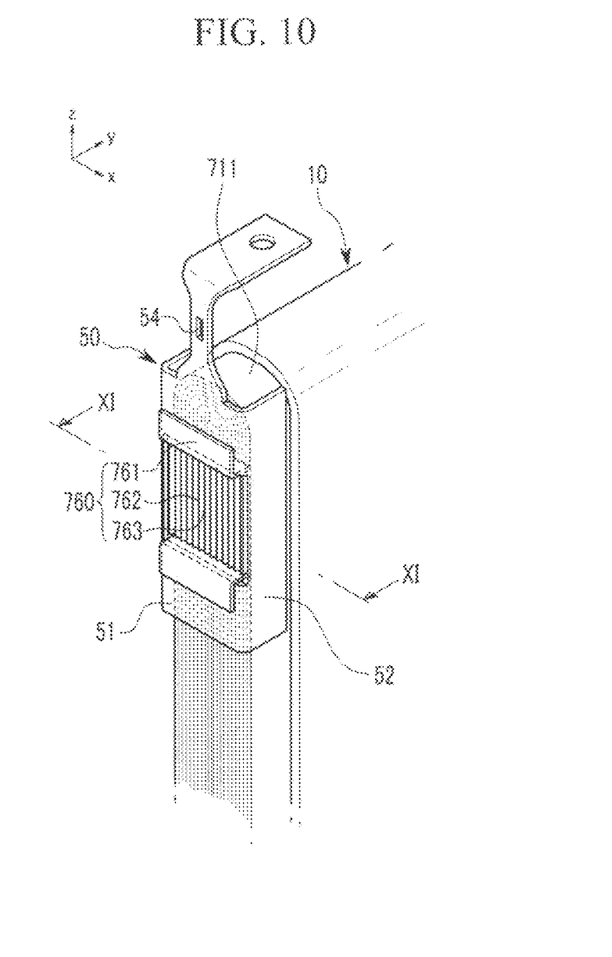
FIG. 10 illustrates a perspective view of a lead member, a current collecting plate and an electrode assembly in a rechargeable battery according to a seventh embodiment.
Figure 11:
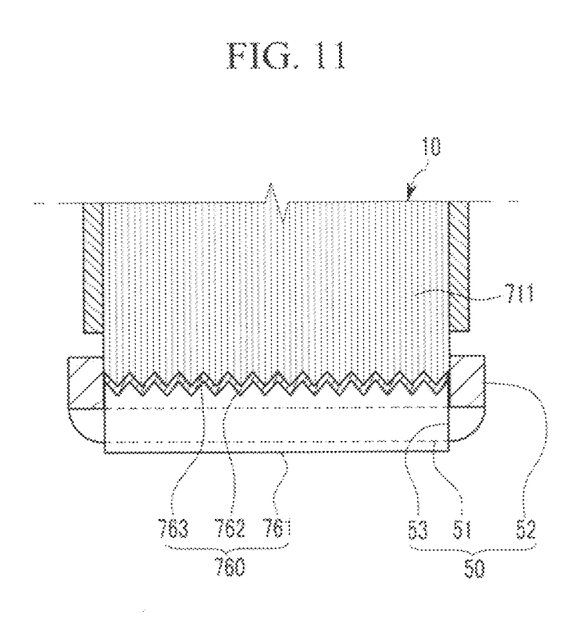
FIG. 11 illustrates a cross-sectional view of FIG. 10, taken along the line XI-XI thereof.

FIG. 10 illustrates a perspective view of the lead member 50, a current collecting plate 760 and the electrode assembly 10 of a rechargeable battery according to a seventh embodiment. FIG. 11 illustrates a cross-sectional view of FIG. 10 taken along the line XI-XI thereof.

Compared to the indentation portion 263 of the current collecting plate 260 of the second embodiment, an indentation portion 763 of the current collecting plate 760 according to the present embodiment may extend in the y-axis direction. The current collecting plate 760 may include a first connection portion 761, a second connection portion 762, and a plurality of indentation portions 763 bent relative to the second connection portion 762. The first and second connection portions 761 and 762 may be bent at an angle relative to each other.

The indentation portions 763 may indent the spiral-wound layers of an uncoated region 711. For example, layers of the uncoated region 711 may extend along the z-direction, and the indentation portions 763 may also extend along the z-direction. Therefore, the indentation portions 763 may indent into the layers of the uncoated region 711. In addition, the plurality of indentation portions 763 may be arranged along the x-axis direction while extending in the z-axis direction. Each indention portion 763 may be welded while contacting a plurality of layers of the uncoated region 711. Each indentation welding structure of the plurality of indentation portions 763 with respect to the layers of the uncoated region 711 may increase bonding strength of a welding point as well as suppress an increase in electrical resistance at the welding point.

Figure 12:
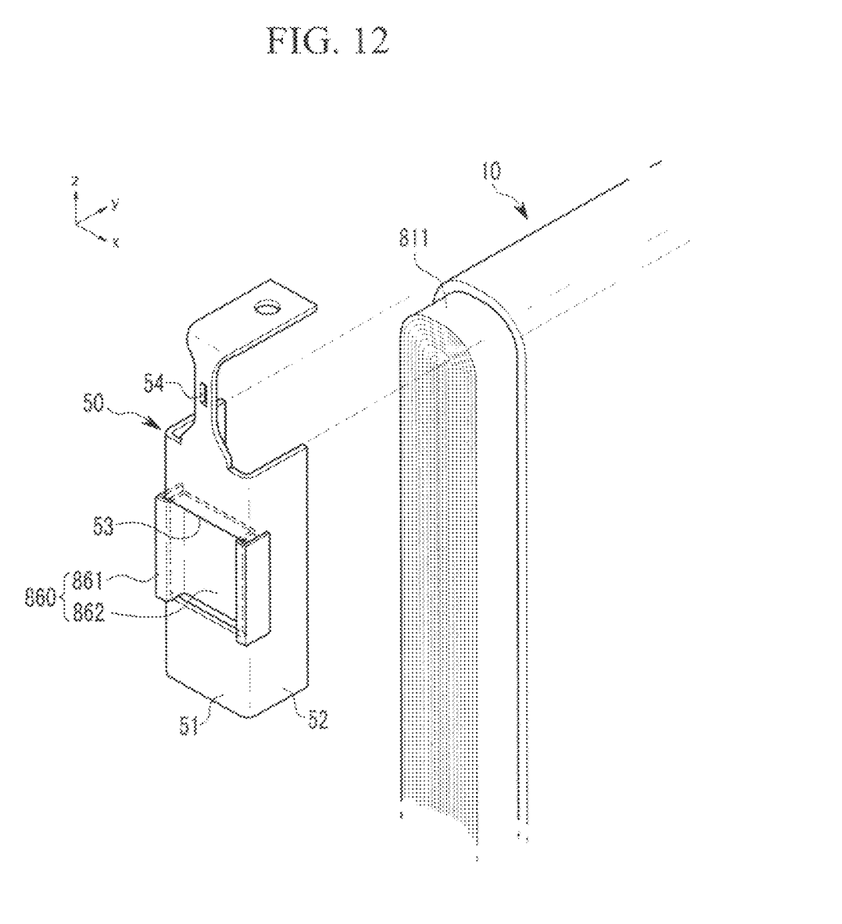
FIG. 12 illustrates an exploded perspective view of a lead member, a current collecting plate and an electrode assembly in a rechargeable battery according to an eighth embodiment.

FIG. 12 illustrates an exploded perspective view of the lead member 50, a current collecting plate 860 and the electrode assembly 10 according to an eighth embodiment. As opposed to the current collecting plate 260 of the second embodiment, the current collecting plate 860 of the eighth embodiment may be welded at sides of the penetration hole 53 in the x-axis direction. A first connection portion 861 of the current collecting plate 860 may be welded to the sides of the penetration hole 53, and a second connection portion 862 may be welded to an uncoated region 811.

The current collecting plate 860 of the eighth embodiment may include the indentation portions 263, 363, 463, 563, 663, and 763 of the second to seventh exemplary embodiments described above in the second connection portion 862. The indentation portions 263, 363, 463, 563, 663, and 763 of the second to seventh exemplary embodiments may be rotated 90 degrees in the second connection portion 862 so that the indentation portions are aligned along the x-axis direction.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
    a case containing an electrode assembly, the electrode assembly having a coated region and an uncoated region;
    a lead member inside the case, the lead member surrounding at least a part of the uncoated region of the electrode assembly and having a first thickness;
    an electrode terminal connected to the lead member; and
    a current collecting plate having a second thickness that is thinner than the first thickness and coupled to the lead member and to the uncoated region.

2. The rechargeable battery as claimed in claim 1, wherein:
    the current collecting plate is welded to the uncoated region, and
    at least a portion of the uncoated region is deformed when welded to the current collecting plate.

3. The rechargeable battery as claimed in claim 2, wherein the lead member has a penetration hole disposed therein, and the current collecting plate is welded to the uncoated region through the penetration hole.

4. The rechargeable battery as claimed in claim 1:
    wherein the lead member includes:
        a first corresponding portion facing an end of the uncoated region and having a penetration hole disposed therein,
        a second corresponding portion bent relative to the first corresponding portion and disposed on sides of the uncoated region; and
    wherein the current collecting plate includes:
        a first connection portion welded to the first corresponding portion adjacent to the penetration hole, and
        a second connection portion bent relative to the first connection portion, protruding from the first connection portion toward the uncoated region and welded to the uncoated region.

5. The rechargeable battery as claimed in claim 4, wherein the second connection portion is configured to apply pressure to the uncoated region.

6. The rechargeable battery as claimed in claim 4, wherein the current collecting plate further includes an indentation portion bent relative to the second connection portion and protrudes toward the uncoated portion from an internal surface of the second connection portion to indent the uncoated region.

7. The rechargeable battery as claimed in claim 6, wherein the indentation portion extends along a first direction across a center of the penetration hole and toward the uncoated region in a second direction that crosses the first direction.

8. The rechargeable battery as claimed in claim 6, wherein the uncoated region includes a plurality of spiral-wound layers and wherein the indentation portion is indented in a direction that crosses the plurality of spiral-wound layers of the uncoated region.

9. The rechargeable battery as claimed in claim 6, wherein the indentation portion includes a plurality of indentation portions arranged along a first direction of the penetration hole and respectively extend in a second direction that crosses the first direction.

10. The rechargeable battery as claimed in claim 6, wherein the indentation portion has a polygonal shape having an open end facing away from the electrode assembly.

11. The rechargeable battery as claimed in claim 10, wherein the polygonal shape having an open end includes at least one of a quadrangle, a triangle and a trapezoid.

12. The rechargeable battery as claimed in claim 6, wherein the indentation portion has a semicircular shape having an open end facing away from the electrode assembly.

13. The rechargeable battery as claimed in claim 6, wherein the uncoated region includes a plurality of spiral-wound layers and the indentation portion extends in a direction substantially parallel to the plurality of spiral-wound layers.

14. The rechargeable battery as claimed in claim 6, wherein the penetration hole extends in a first direction and the indentation portion extends in a direction parallel with the first direction of the penetration hole.

15. The rechargeable battery as claimed in claim 14, wherein the indentation portion includes a plurality of indentation portions disposed along a second direction that crosses the first direction of the penetration hole.

16. The rechargeable battery as claimed in claim 4, wherein the first corresponding portion further includes a gas outlet.

17. The rechargeable battery as claimed in claim 4, wherein the penetration hole extends in a first direction and has two sides in the first direction and wherein the first connection portion is connected to both of the two sides of the first direction of the penetration hole.

18. The rechargeable battery as claimed in claim 4, wherein the penetration hole extends in a first direction and in a second direction that crosses the first direction, the penetration hole having a pair of sides in the second direction, and wherein the first connection portion is connected to both of the pair of sides in the second direction of the penetration hole.

19. The rechargeable battery as claimed in claim 1:
    further including a cap plate having a terminal hole, the cap plate sealing an opening of the case; the electrode terminal protruding through the terminal hole of the cap plate; and
    wherein the electrode assembly includes a positive electrode and a negative electrode wound with a separator therebetween.

* * * * *